US012750310B2

(12) United States Patent
Mahadevan et al.

(10) Patent No.: US 12,750,310 B2
(45) Date of Patent: Sep. 29, 2026

(54) INTENT-BASED ORCHESTRATION OF ROUTING CONTROLS ACROSS A NETWORK OVERLAY

(71) Applicant: Cisco Technology, Inc., San Jose, CA (US)

(72) Inventors: Satish Kumar Mahadevan, San Ramon, CA (US); Sourav Sen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 25 days.

(21) Appl. No.: 18/658,585

(22) Filed: May 8, 2024

(65) Prior Publication Data

US 2025/0350555 A1 Nov. 13, 2025

(51) Int. Cl.

*H04L 45/42* (2022.01)
*H04L 45/02* (2022.01)
*H04L 45/74* (2022.01)

(52) U.S. Cl.

CPC .............. *H04L 45/42* (2013.01); *H04L 45/04* (2013.01); *H04L 45/74* (2013.01)

(58) Field of Classification Search

CPC .......... H04L 45/42; H04L 45/04; H04L 45/74
See application file for complete search history.

(56) References Cited

U.S. PATENT DOCUMENTS

| | | | | |
|---|---|---|---|---|
| 11,916,786 B2 | 2/2024 | Thoria et al. | | |
| 2004/0190527 A1* | 9/2004 | Okura | H04L 45/00 | 370/395.21 |
| 2008/0247392 A1* | 10/2008 | White | H04L 45/50 | 370/392 |
| 2013/0238813 A1 | 9/2013 | Tanimoto | | |

(Continued)

FOREIGN PATENT DOCUMENTS

WO WO2023019157 A1 2/2023

OTHER PUBLICATIONS

David, et al., “Software Defined Networking (SDN) for Campus Networks, WAN, and Datacenter”, 2023 International Conference on Smart Applications, Communications and Networking (SMARTNETS), IEEE, Jul. 25, 2023, pp. 1-8.

(Continued)

*Primary Examiner* — Michael A Keller
*Assistant Examiner* — Thao D Duong
(74) *Attorney, Agent, or Firm* — Lee & Hayes, P.C.

(57) ABSTRACT

Techniques for enabling centralized distribution and configuration of routing control settings in a software-defined wide area network (SD-WAN) overlay are disclosed herein. In some aspects, the techniques described herein relate to defining a new address family in a communication protocol. The techniques may enable users to provide input related to configurations for routing control settings in a hierarchical manner. The routing controller may identify device(s) in the SD-WAN and send the routing control settings to the edge devices using the new address family. The techniques (Continued)

described herein provide a streamlined and dynamic way to manage routing controls, while also enabling centralized distribution of routing control settings, routes, best path data, etc. from a centralized routing controller.

20 Claims, 7 Drawing Sheets

(56) References Cited

U.S. PATENT DOCUMENTS

| | | | | |
|---|---|---|---|---|
| 2016/0134591 | A1* | 5/2016 | Liao | H04L 45/04 726/15 |
| 2017/0041211 | A1 | 2/2017 | Pandya et al. | |
| 2020/0145316 | A1 | 5/2020 | Sosthène Enguehard et al. | |
| 2020/0396141 | A1 | 12/2020 | Sundararajan et al. | |
| 2022/0052984 | A1 | 2/2022 | Valluri et al. | |
| 2023/0052974 | A1* | 2/2023 | Thoria | H04L 63/029 |
| 2023/0127962 | A1* | 4/2023 | Narayan | H04L 45/50 370/254 |
| 2024/0333631 | A1* | 10/2024 | Zafer | H04L 41/40 |
| 2024/0364597 | A1* | 10/2024 | Coulon | H04L 43/0811 |
| 2025/0008328 | A1* | 1/2025 | Smith | H04L 41/5054 |
| 2025/0168099 | A1* | 5/2025 | Dunbar | H04L 47/125 |

OTHER PUBLICATIONS

Search Report and Written Opinion for International Application No. PCT/US25/28296, Dated Aug. 28, 2025, 16 pages.

* cited by examiner

INTENT-BASED ORCHESTRATION OF ROUTING CONTROLS ACROSS A NETWORK OVERLAY

TECHNICAL FIELD

The present invention relates generally to computer networking and more specifically to controller-based and intent-based orchestration of routing control settings across a in a Software-Defined Wide Area Network (SD-WAN) overlay.

BACKGROUND

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of networks, such as Local-Area Networks (LANs) that are in one physical location such as a building, Wide-Area Networks (WANs) that extend over a large geographic area to connect individual users or LANs, Enterprise Networks that are built for a large organization, Internet Service provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

One example network is an enterprise network that utilizes a software defined wide area network (SD-WAN). SD-WAN is an overlay architecture that builds secure, unified connectivity over any transport technology (Multiprotocol Label Switching (MPLS), broadband, Long-Term Evolution (LTE), Very Small Aperture Terminal (VSAT), and others). In general, SD-WAN provides a cost-effective, flexible, and scalable approach network management. SD-WAN can use software to abstract the underlying physical network infrastructure and provides a centralized control plane to manage the network. In SD-WAN networks, the topology, allocated capacity per site per link, the QoS policies, AAR (Application Aware Routing) policies, etc. may be defined by network administrators to optimize network operation and cost and ensure that the users are able to access the network and applications with a good quality of experience.

SD-WANs may utilize multiple controllers in the network overlay, where each controller may send different routing information to edge device(s) within the SD-WAN using an Overlay Management Protocol (OMP). For instance, SD-WANs may utilize different controllers to perform different tasks for each device and OMP may provide various settings that a user may configure for each individual edge device.

However, in large scale networks, the SD-WAN may comprise thousands of edge devices and an administrator may need to configure the routing settings for the edge devices individually. For instance, where a software update is deployed within the SD-WAN, the network administrator may need to additionally configure each of the edge routers individually to enable a particular topology, routing model, routing setting, etc. associated with the software update. This is not only time-consuming and inefficient, but can result in errors and is costly. Further, the time it takes for various features to be implemented may result in lag within the network, drops of network traffic, etc.

Accordingly, there is a need for a simplified architecture within the SD-WAN overlay.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1A:
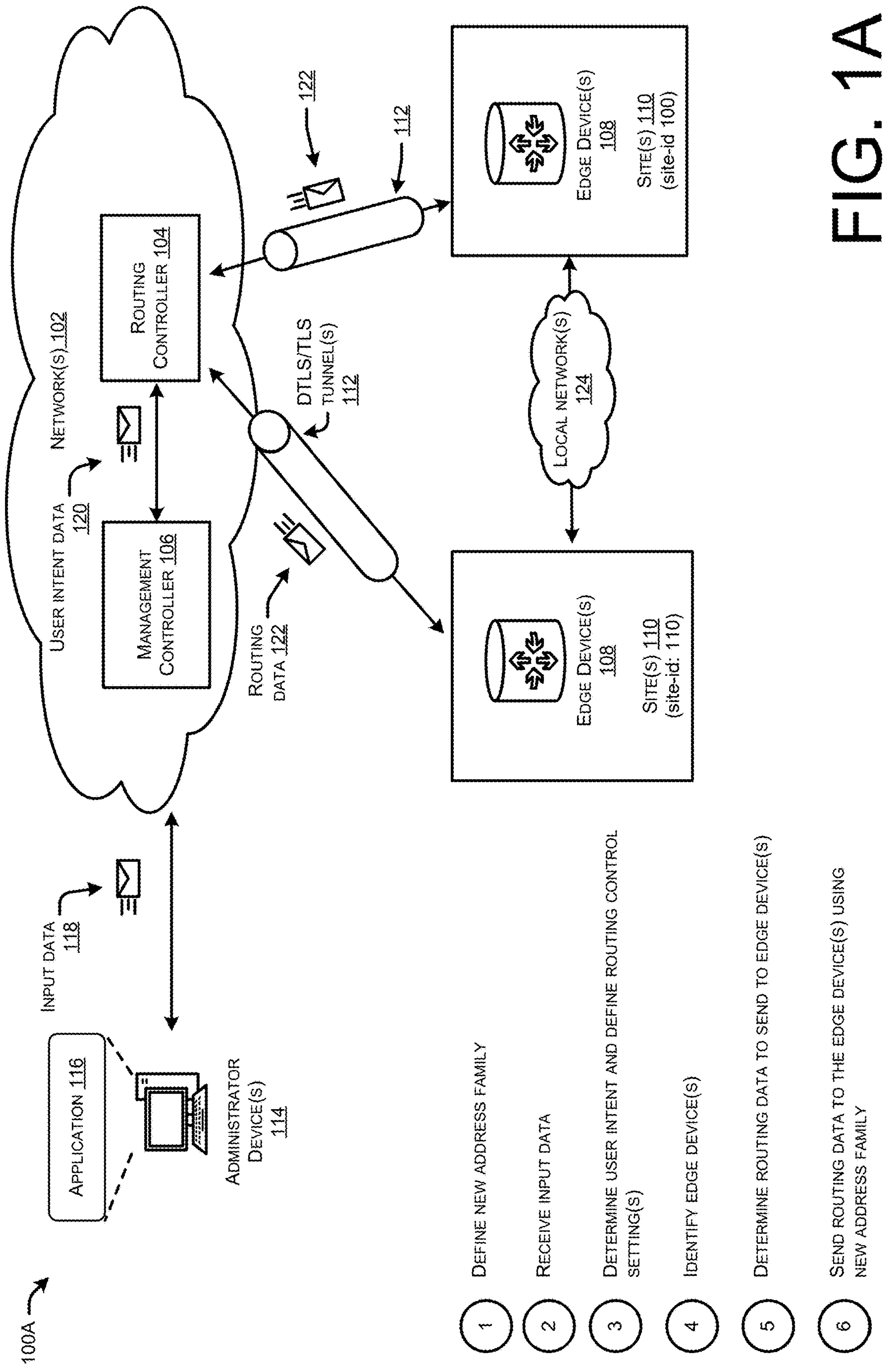
FIG. 1A illustrates a system-architecture diagram of an environment in which a system can dynamically and centrally distribute routing control setting(s) in a SD-WAN overlay based on user intent.

The present disclosure relates generally to the field of computer networking and more specifically to controller-based and intent-based orchestration of routing control settings across a in a Software-Defined Wide Area Network (SD-WAN) overlay. For instance, the techniques described herein may dynamically configuring and distributing routing controls to edge devices in a SD-WAN overlay via a centralized routing controller.

A method to perform the techniques described herein may include receiving, by the controller, input data associated with an action corresponding to one or more edge devices within the SD-WAN. The method may include defining, by the controller and based on the input data, routing control settings associated with the action. The method may also include identifying, by the controller, a connection to an edge device of the one or more edge devices. The method may include determining, by the controller and based on identifying the edge device, a routing control setting of the routing control settings to apply to the edge device. The method may also include sending, by the controller, the routing control setting to the edge device.

Additionally, any techniques described herein, may be performed by a system and/or device having non-transitory computer-readable media storing computer-executable instructions that, when executed by one or more processors, performs the method(s) described above and/or one or more non-transitory computer-readable media storing computer-readable instructions that, when executed by one or more processors, cause the one or more processors to perform the method(s) described herein.

Example Embodiments

As noted above, an example network may include an enterprise network that utilizes a software defined wide area network (SD-WAN). SD-WAN is an overlay architecture that builds secure, unified connectivity over any transport technology (Multiprotocol Label Switching (MPLS), broadband, Long-Term Evolution (LTE), Very Small Aperture Terminal (VSAT), and others). In general, SD-WAN provides a cost-effective, flexible, and scalable approach network management. SD-WAN can use software to abstract the underlying physical network infrastructure and provides a centralized control plane to manage the network. In SD-WAN networks, the topology, allocated capacity per site per link, the QoS policies, AAR (Application Aware Routing) policies, etc. may be defined by network administrators to optimize network operation and cost and ensure that the users are able to access the network and applications with a good quality of experience.

SD-WANs may utilize multiple controllers in the network overlay, where each controller may send different routing information to edge device(s) within the SD-WAN using an Overlay Management Protocol (OMP). For instance, SD-WANs may utilize different controllers to perform different tasks for each device and OMP may provide various settings that a user may configure for each individual edge device.

However, in large scale networks, the SD-WAN may comprise thousands of edge devices and an administrator may need to configure the routing settings for the edge devices individually. For instance, where a software update is deployed within the SD-WAN, the network administrator may need to additionally configure each of the edge routers individually to enable a particular topology, routing model, routing setting, etc. associated with the software update. This is not only time-consuming and inefficient, but can result in errors and is costly. Further, the time it takes for various features to be implemented may result in lag within the network, drops of network traffic, etc.

Accordingly, there is a need for a simplified architecture within the SD-WAN overlay.

This disclosure describes techniques for dynamically configuring and distributing routing controls to edge devices in a SD-WAN overlay via a centralized routing controller. In some examples, the techniques include receiving, by the controller, input data associated with an action corresponding to one or more edge devices within the SD-WAN. The techniques may include defining, by the controller and based on the input data, routing control settings associated with the action. The techniques may also include identifying, by the controller, a connection to an edge device of the one or more edge devices. The techniques may further include determining, by the controller and based on identifying the edge device, a routing control setting of the routing control settings to apply to the edge device. The techniques may include sending, by the controller, the routing control setting to the edge device.

In some examples, the techniques may enable a network administrator to centrally control all aspects of routing, including various best-path options and configurable settings (e.g., knobs) through a routing controller based on user intent, thereby providing additional simplification for the network administrator. In some embodiments, the user intent for routing control is defined centrally on a central controller (e.g., such as Cisco's vSmart), and the control topology is configured in a multi-layered hierarchical format.

In some examples, the routing controller may receive the user intent data may comprise information (e.g., routing control(s) to enable, disable, update, site identifier(s), site tag list(s), region list(s), region identifier(s), sub-region identifier(s), sub-region list(s), etc.) associated with one or more routing control settings (e.g., prefer transport gateway for specific site tag type(s), perform ECMP between direct and transport gateway paths, prefer hierarchical paths over direct paths, do ECMP between both hierarchical paths and direct paths, define affinity-preference-order on devices to influence hub and/or border router selection, etc.). The routing controller may define, based on the user intent data, routing control settings for groups of edge device(s) based on the hierarchy. For instance, the routing controller may define the routing control setting(s) for edge device(s) at particular site(s), sub-region(s), and/or region(s) within the SD-WAN using one or more of site id(s), site list(s), sub-region id(s), sub-region list(s), region id(s), and/or region list(s) included in the user intent data.

In some examples, the routing controller may identify connection(s) to the edge device(s). In some examples, the connection(s) may comprise existing connections between the routing controller and one or more edge device(s). The routing controller may determine routing control setting(s) to apply to a particular edge device based on the connection (e.g., identifier associated with a particular edge device) and may send the routing control settings to the particular edge device via the connection. In some examples, the connection (s) may comprise a new connection. For instance, the routing control settings may be configured prior to the edge device(s) connecting to the routing controller. In this example, the routing controller may determine, when the new connection is formed, the routing control setting(s) to apply to a particular edge device and may send the routing control setting(s) via the new connection.

In some examples, the system may define a new address family within a communication protocol. For instance, the system may configure the network address family for distributing different routing control settings to edge devices of the SD-WAN. In some examples, the new address family may be defined within an overlay management protocol (OMP). For instance, the new address family may be added to an existing set of address families in the OMP. For example, the OMP is currently or already configured with a number of has address families applicable to distribute different types of information. For example, existing address families include TLOC, IPv4-vroutes, IPv6-vroutes, IPv4-service-routes, IPv6-service-routes, CXP-routes, Multicast-routes etc. Accordingly, the system may configure a new address family (e.g., "Routing-control-settings" or any other suitable name), configured to distribute routing control settings as routing data to the edge device(s) via the OMP connection(s). That is, the system may distribute the routing control settings as routing data, where the edge device(s) are configured to decrypt the routing data and apply the routing control settings. Thus, the system can extend the OMP protocol to distribute new routing data, such that all routing information (e.g., best path routing data, route(s), routing control settings, etc.) is distributed to the edge device(s) from a single, centralized source (e.g., the routing controller). While the examples described herein relate to OMP, it is understood that the techniques described herein may be applied to any suitable communication protocol.

In some examples, the edge devices may be configured with site tag type(s). In some examples, each site tag is configured without or does not have any inherent meaning thereof. However, routing control settings may be defined on the routing controller in terms of the site tag type. Accordingly, all edge devices with existing or new connections that have a respective site tag type may automatically receive associated routing-control updates from the routing controller when routing control settings are configured by a network administrator. moreover, where a site is initiated and/or assigned to an existing site tag type for which routing control settings are already defined or available, the routing control settings associated with the site tag type may be automatically distributed to all of the edge device(s) at the newly initiated site. This also allows the routing control settings (e.g., the knobs) to be defined at a higher level of abstraction that is not affected by newly added sites. This also allows the routing control settings to be defined a higher-level of abstraction based on user-intent, thereby providing additional simplification for the network administrator.

In some examples, the techniques described herein may provide dynamic updating of routing control settings. For instance, the routing controller may monitor traffic within the SD-WAN. The routing controller may detect that a particular site tag type has been introduced within the SD-WAN. For instance, the site tag type may correspond to a transport gateway that is to be used to send traffic from edge device(s) to the cloud. In this example, the routing controller may generate a routing control update and send the routing control update to the edge device(s) within the SD-WAN using existing connection(s) and/or when new connection(s) are formed. The routing control update may comprise an instruction to update a routing control setting, such that the edge device(s) send cloud data traffic via a particular transport gateway.

In some examples, the techniques may be utilized in conjunction with centralized control policies. In particular, the routing control settings described herein do not influence how the controller(s) of the SD-WAN determine best-path attributes and/or how route(s) are distributed to edge devices for different address families. Further, unlike centralized control policies, the routing control setting(s) may be distributed directly to the edge device(s). Accordingly, the techniques may utilize routing control settings in a complimentary manner to centralized control policies.

In this way the system may provide a streamlined and simplified way to control routing in an SD-WAN overlay. That is, the system enables user intent to be defined by central routing controller, where the routing controller may use existing channels of communication with the edge routers to translate the user intent into the appropriate OMP routing control settings, which can then be distributed as OMP routing control updates to the appropriate edge routers. This allows a user to control routing and traffic engineering based on intent at the overlay level, instead of providing routing information on a device-to-device basis. Thus, updates to the edge device(s) can be distributed automatically and from a single source, thereby streamlining routing control processes and reducing network costs. Moreover, by utilizing a hierarchical and dynamic distribution model, the claimed techniques may enable the routing controller to automatically resolve conflicts between the applicable routing control settings and edge device settings, such that the routing control settings can be dynamically applied by the edge devices in real-time.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A illustrates a system-architecture diagram of an environment in which a system 100A can dynamically and centrally distribute routing control setting(s) in a SD-WAN overlay based on user intent. While the system 100A shows an example management controller 106 and an example routing controller 104, it is understood that any of the components of the system may be implemented on any device in the network 102 and/or any cloud-based service provider. In some examples, one or more components of the management controller 106 and routing controller 104 may be implemented as a single controller and/or as part of a same device.

In some examples, the system 100A may include network(s) 102. The network 102 may include one or more networks implemented by any viable communication technology, such as wired and/or wireless modalities and/or technologies. The network 102 may include any combination of Personal Area Networks (PANs), SDCI, Local Area Networks (LANs), Campus Area Networks (CANs), Metropolitan Area Networks (MANs), extranets, intranets, the Internet, short-range wireless communication networks (e.g., ZigBee, Bluetooth, etc.), Wide Area Networks (WANs)—both centralized and/or distributed, SD-WANs, SDNs—and/or any combination, permutation, and/or aggregation thereof. The network 102 may include devices, virtual resources, or other nodes that relay packets from one network segment to another by nodes in the computer network. The network(s) 102 may include multiple devices that utilize the network layer (and/or session layer, transport layer, etc.) in the OSI model for packet forwarding, and/or other layers. In some examples, the network(s) 102 correspond to an SD-WAN overlay.

The system 100A may comprise a management controller 106 and/or a routing controller 104. In some examples, the routing controller 104 corresponds to a system that has complete visibility into the fabric of a given network. In some examples, the routing controller 104 may comprise a controller, one or more processors, memory etc., In some examples, the routing controller 104 may be integrated as part of one or more of Cisco's vAnalytics feature, and/or included in a SD-WAN architecture. In some examples, the management controller 106 may be integrated as part on Cisco's Cisco's vManage feature.

In some examples, the management controller 106 is configured to communicate with administrator device(s) 114. Administrator device(s) 114 may correspond to a computing device utilized by a network administrator, user of the network(s) 102, etc. Administrator device(s) 114 may comprise application 116, what may be used to communicate with the management controller 106 and/or routing controller 104. For instance, application 116 may be provided by a service provider (e.g., such as Cisco) to enable a user to interact with service(s) of the network(s) (e.g., vManage, vSmart, etc.). In some examples, the management controller 106 may be configured to receive input data 118 from the administrator device 114 and/or application 116. Input data 118 may comprise one or more identifier(s) (e.g., edge device identifier(s), site identifier(s), sub-region identifier (s), region identifier(s), etc.), one or more routing control settings, an action (e.g., software update, feature, etc.), site tag type(s) (e.g., cloud, server, etc.), one or more list(s) (e.g., site list(s), sub-region list(s), region list(s), etc.), affinity preference(s), best path configuration data, or any other type of data.

In some examples, the management controller 106 is configured to communicate with the routing controller 104. For instance, the management controller 106 may be configured to send user intent data 120 to the routing controller 104. The user intent data 120 may comprise the input data 118, flow data, or any other suitable data. Flow data may comprise one or more application characteristics and/or network characteristics. The application characteristics may comprise one or more of flow telemetry (e.g., an application identifier, flow count-how many flows is the application creating, bytes, octets, bandwidth requirements, a number of users that access the application, drops, event(s) associated with the drops, DSCP markings); interface data (e.g., bandwidth utilization, total octets, packet(s), maximum supported line rate, tail drops, etc.); link characteristics (e.g., internet service provider (ISP) name, purchased bandwidth or available maximum bandwidth, link type (e.g., MPLS, Internet, LTE, etc.), geographic region, etc.); quality of service (QOS) prioritization requirements (e.g., low latency queuing, bandwidth reservation, etc.); application quality metrics (e.g., application performance index, application telemetry, application feedback, etc.); and/or any other suitable data or characteristic.

The routing controller 104 may correspond to Cisco's vAnalytics feature. In some examples, the routing controller 104 may be configured to collect the telemetry data and learn network patterns, traffic patterns, and application characteristics for a plurality of applications across a plurality of networks. For instance, the routing controller 104 may utilize the telemetry data to learn the application characteristics of a particular application. In some examples, the routing controller 104 may also utilize network data (e.g., topology, policy information, etc.) or any other suitable data.

In some examples, the routing controller 104 may generate application model(s) of application(s) based on the telemetry data. In some examples, the application model(s) may correspond to application behavior of the application as a whole and/or one or more flows. For instance, the application model(s) may provide output indicative of a particular application's behavior. For instance, the output may comprise one or more of application bandwidth requirement per user, traffic volume that the application generates per user, flow characteristics (e.g., bandwidth utilization requirements per flow per user, number of flows per user, flow density per user (e.g., whether a flow is bursty in nature, steady, etc.), volume of traffic per flow, volume of traffic per flow over time, etc.); network SLA requirements (e.g., network loss, latency, jitter) in which this application behaves most optimally; usage pattern and seasonality (e.g., such as a usage heatmap, periodicity of use across day, week, month, etc.); pattern of access (1-N, N-1, 1-1); prioritization requirements at which the application behaves most optimally, or any other suitable parameter and/or output.

In some examples, the routing controller 104 may comprise one or more pre-trained models and/or pre-trained weighted models. In some examples, the artificial intelligence models are pre-trained using machine learning techniques. In some examples, the change window system may store machine-trained data models for use during operation. Machine learning techniques include, but are not limited to supervised learning algorithms (e.g., artificial neural networks, Bayesian statistics, support vector machines, decision trees, classifiers, k-nearest neighbor, etc.), regression models, unsupervised learning algorithms (e.g., artificial neural networks, association rule learning, hierarchical clustering, cluster analysis, etc.), semi-supervised learning algorithms, deep learning algorithms, etc.), statistical models, etc.

The routing controller 104 may be configured to communicate with one or more edge device(s) 108 at one or more site(s) 110 within the network(s) 102. The site(s) may comprise data centers, which may be physical facilities or buildings located across geographic areas that designated to store networked devices that are part of a manufacturer. The data centers may include various network devices, as well as redundant or backup components and infrastructure for power supply, data communications connections, environmental controls, and various security devices. In some examples, the data centers may include one or more virtual data centers which are a pool or collection of cloud infrastructure resources specifically designed for enterprise needs, and/or for cloud-based service provider needs. Generally, the data centers (physical and/or virtual) may provide basic resources such as processor (CPU), memory (RAM), storage (disk), and networking (bandwidth). However, in some examples the devices in the packet-forwarding networks may not be located in explicitly defined data centers, but may be located in other locations or buildings. In some examples, the site(s) comprise network device(s), which may correspond to any computing device, routers, switches, computers, or any other type of network device.

Edge device(s) 108 may comprise routers, switches, access points, stations, radios, and/or any other network device. In some examples, and as described in greater detail in FIG. 1B below, may communicate directly with other edge device(s), such as via local connection(s) (e.g., local network(s) 124) and/or may communicate with other edge device(s) or service(s) (e.g., such as a cloud service) via a transport gateway. In some examples, the edge device(s) 108 may be configured to communicate with other edge device(s) of different site(s) via local network(s) 124. In some examples, local network(s) 124 may comprise one or more network(s), such as Internet, WAN, etc.

For instance, the routing controller 104 may be connected to site(s) 110 via DTLS/TLS tunnel(s) 112. In some examples, the DTLS/TLS tunnel(s) 112 may be formed via an overlay management protocol (OMP). For instance, each connection, which runs as a DTLS tunnel, may be established according to the OMP. For instance, each connection may be established after the routing controller 104 performs a successful device authentication. In some examples, the DTLS/TLS tunnel 112 carries an encrypted payload between the routing controller 104 and the edge router. The encrypted payload may comprise route information that enables the routing controller 104 to determine network topology and calculate the best routes to network destinations. The routing controller 104 may distribute the route information to the edge routers via the DTLS/TLS tunnel(s) using an address family. In some examples, the DTLS connection between the routing controller 104 and an edge router is a permanent connection.

As noted above, the techniques described herein may extend the OMP to incorporate a new address family that is configured to send routing data 122 to the edge device(s) 108. In some examples, the routing controller 104 may send routing data 122 to the edge device(s) 108 via the DTLS/TLS tunnel(s) 112. Routing data 122 may comprise routing control setting(s) specific to a particular edge device connected to the routing controller 104 via the DTLS/TLS tunnel 112. In some examples, routing data 122 may be sent using the new address family defined by the system 100A for the OMP protocol. In some examples, routing data 122 may be sent as an OMP routing update. In some examples, the edge device(s) 108 are configured to receive the routing data 122, decrypt the routing data, and dynamically apply the routing control setting(s) to the edge device.

In some examples, the edge devices may be configured with site tag type(s). In some examples, each site tag type is configured without or does not have any inherent meaning thereof. However, routing control settings may be defined on the routing controller in terms of the site tag type. Accordingly, all edge devices with existing or new connections that have a respective site tag type may automatically receive associated routing-control updates from the routing controller when routing control settings are configured by a network administrator. moreover, where a site is initiated and/or assigned to an existing site tag type for which routing control settings are already defined or available, the routing control settings associated with the site tag type may be automatically distributed to all of the edge device(s) at the newly initiated site. This also allows the routing control settings to be defined at a higher level of abstraction that is not affected by newly added sites. This also allows the routing control settings to be defined a higher-level of abstraction based on user-intent, thereby providing additional simplification for the network administrator.

At “1”, the system may define a new address family. For instance, as noted above, the new address family may be defined within the OMP. Examples of existing address-families are TLOC, IPv4-vroutes, IPv6-vroutes, IPv4-service-routes, IPv6-service-routes, CXP-routes, Multicast-routes etc. Each address family is configured to distribute various kinds of routing information. The system may define a new address family in OMP that is configured to distribute routing control setting(s) from a routing controller 104 and to edge device(s) 108.

At “2”, the system may receive input data. For instance, the input data may correspond to input data 118. Input data 118 may be received from an administrator device 114 and/or application 116. In some examples, input data comprises information associated with an action (e.g., software update, feature update, etc.), routing control setting(s) (e.g., to enable, disable, update), edge device identifier(s), site identifier(s), site list(s), region list(s), region identifier(s), sub-region identifier(s), sub-region list(s), etc. associated with edge device(s) 108 and site(s) within the SD-WAN.

At “3”, the system may determine user intent and define routing control setting(s). For instance, the user intent data may correspond to user intent data 120. As noted above, the user intent data 120 may identify group(s) of edge device(s) with which to apply one or more routing control settings (e.g., prefer transport gateway for specific site tag type(s), perform ECMP between direct and transport gateway paths, prefer hierarchical paths over direct paths, do ECMP between both hierarchical paths and direct paths, define affinity-preference-order on devices to influence hub and/or border router selection, etc.). The system may define, based on the user intent data, routing control settings for the groups of edge device(s) based on a hierarchy. For instance, the routing controller may define the routing control setting(s) for edge device(s) at particular site(s), sub-region(s), and/or region(s) within the SD-WAN using one or more of site id(s), site list(s), sub-region id(s), sub-region list(s), region id(s), and/or region list(s) included in the user intent data. In some examples, the system may define a hierarchy with which to apply the routing control settings, based on the user intent data. For instance, the following precedence hierarchy may be defined: Site-list level routing control setting(s) may have the highest priority and will override everything else. Site tag level routing control setting(s) have the second highest priority. Sub-region level routing control setting(s) have the third highest priority. Region-level routing control setting(s) will be applied (if none of the above are available). In some examples, the system 100A may store, in memory of the routing controller 104, associations between the routing control setting(s) that are configured and the edge device(s) 108, identifier(s), the configured routing control setting(s), user intent data, etc.

At “4”, the system may identify edge device(s). For instance, the system may identify edge device(s) based on identifying existing connection(s) to the edge device(s). The existing connection(s) may correspond to the DTLS/TLS tunnels 112. In some examples, the system may identify edge device(s) based on establishing a new connection to edge device(s). For instance, the system may perform step “3” before any connection(s) are established between the edge device(s) 108 and the routing controller 104. Accordingly, once a new connection is established, OMP peering may be enabled between the edge device(s) and the routing controller 104.

At “5,” the system may determine routing data to send to edge device(s). For instance, with edge device(s) 108 connected to the routing controller 104, OMP peering may be established. Accordingly, the routing controller may determine initial settings of the edge device(s) and may, based on the update and user intent, determine the routing control settings to apply to each particular edge device.

At “6,” the system may send routing data to the edge device(s) using the new address family. For instance, the system may send routing data 122 via the DTLS/TLS tunnel(s) 112. The system may send the routing data, where the routing data may be translated into an OMP update via the new address family.

In current SD-WANs that utilize OMP, management controller(s) may manage routing information received from edge device(s) and send best path configuration(s) to the edge devices. Additionally, the management controller(s) currently configures each edge device individually, as well as configures the routing controllers. The routing controller(s) under existing techniques may act as route reflectors, and may send available route(s) to edge devices, so that the edge device(s) can select which path to select using the best path configurations received from the management controllers.

Unlike existing architectures, the techniques described herein may enable the routing controller 104 to send route(s) (including routing data 122) as well as best path configurations to the edge device(s). In some examples, each route is associated with a separate address family. Accordingly, by distributing the routing data 122 via the new address family, an edge device may dynamically apply the change. For instance, Moreover, the distribution of routing control settings may be performed by the routing controller in a centralized manner and based on the user intent data. As noted above, where there is a software update, feature release, etc. in existing SD-WAN architectures, the update may be applied to all edge device(s) 108 within the network(s) 102. In existing techniques, in order to enable a feature and/or setting, an administrator manually configures the routing control setting(s) for each edge device individually.

Unlike existing techniques, the system described herein enables a network administrator to define a hierarchy of groups of edge device(s) to apply the routing control setting(s) to as part of the user input. The routing controller 104 may then automatically and dynamically identify the edge device(s), determine which routing control setting(s) apply to the edge device(s), and send the routing data such that the routing control setting(s) can be automatically applied across the network overlay.

In this way the system may provide a streamlined and simplified way to control routing in an SD-WAN overlay. That is, the system enables user intent to be defined by central routing controller, where the routing controller may use existing channels of communication with the edge routers to translate the user intent into the appropriate OMP routing control settings, which can then be distributed as OMP routing control updates to the appropriate edge routers. This allows a user to control routing and traffic engineering based on intent at the overlay level, instead of providing routing information on a device-to-device basis. Thus, updates to the edge device(s) can be distributed automatically and from a single source, thereby streamlining routing control processes and reducing network costs. Moreover, by utilizing a hierarchical and dynamic distribution model, the claimed techniques may enable the routing controller to automatically resolve conflicts between the applicable routing control settings and edge device settings, such that the routing control settings can be dynamically applied by the edge devices in real-time.

Figure 1B:
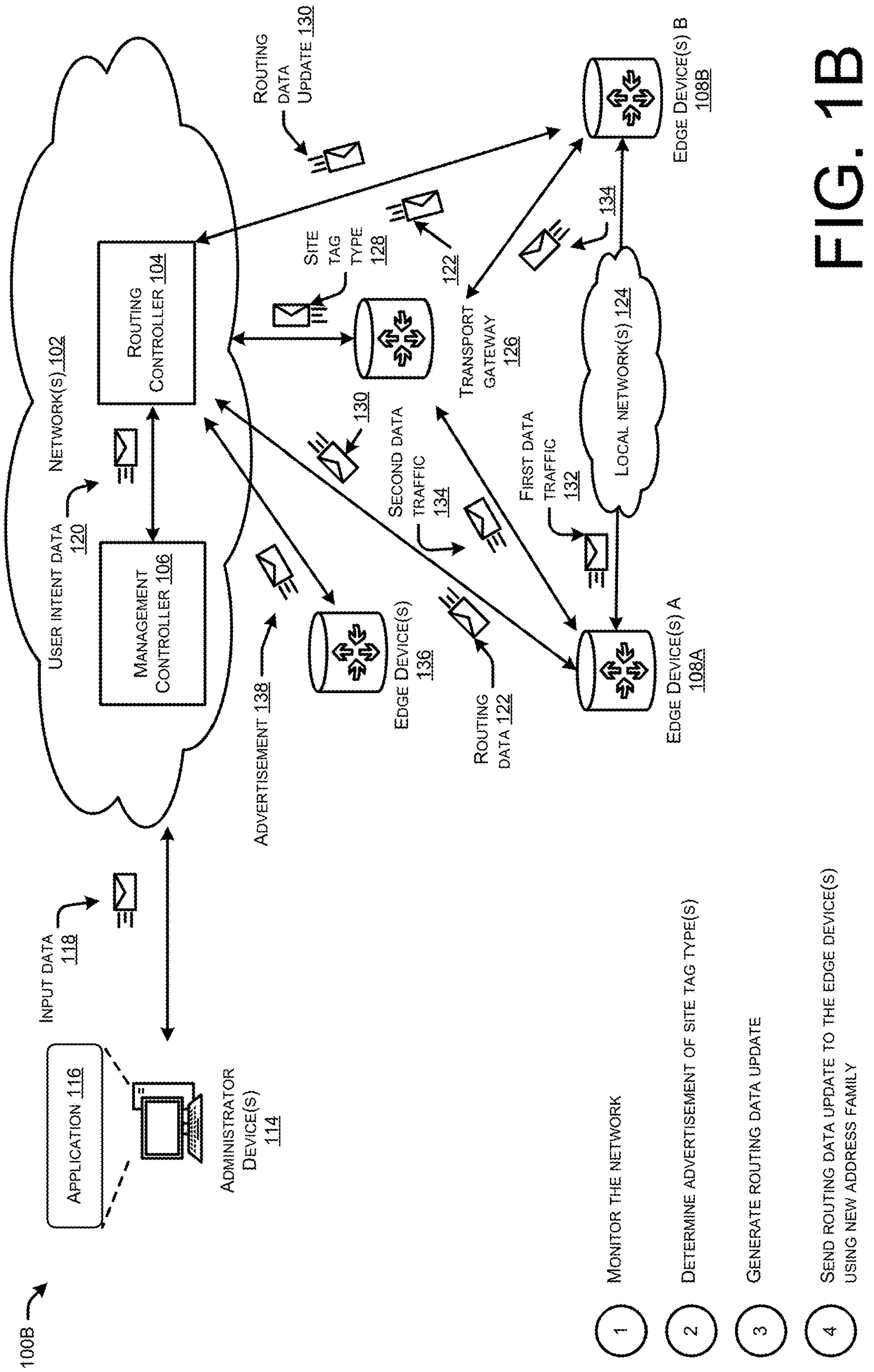
FIG. 1B illustrates a system-architecture diagram of an environment in which a system can dynamically distribute routing control setting(s) in a SD-WAN overlay.

FIG. 1B illustrates a system-architecture diagram of an environment in which a system 100B can dynamically distribute routing control setting(s) in a SD-WAN overlay. While the system 100B shows an example routing controller 104, it is understood that any of the components of the system may be implemented on any device in the system 100B and/or system 100A of FIG. 1A. In some examples, the techniques described in system 100B may be used independently of the techniques described in system 100A of FIG. 1A. In some examples, the techniques of system 100B may be used in addition to the techniques described in system 100A of FIG. 1A. For instance, the techniques described in system 100B may be performed following the steps described in system 100A of FIG. 1A.

As illustrated in FIG. 1B, the system 100B comprises network(s) 102, management controller 106, administrator device(s) 114, application 116, routing controller 104, edge device(s) 108, input data 118, user intent data 120, routing data 122, and local network(s) 124.

While not illustrated, edge device(s) A 108A may correspond to a first site (e.g., such as a site 110 with site-id "110") described in FIG. 1A) and edge device(s) B 108B may correspond to the same site or a different site (e.g., such as site 110 with site-id "100" described in FIG. 1A) within the network(s) 102. As illustrated, edge device(s) A 108A and edge device(s) B 108B are connected to the routing controller 104. As described in FIG. 1A, the connection may comprise a DTLS/TLS tunnel formed via OMP. Edge device A 108A may send and/or receive first data traffic 132 to edge device(s) B108 via the direct connection of the local network(s). The first data traffic 132 may comprise flow data and/or any data traffic with any destination within the SD-WAN (e.g., a cloud service, a particular, branch, etc.).

As illustrated in FIG. 1B and described in system 100A of FIG. 1A above, the system 100B may receive input data 118 from administrator device(s) 114. The management controller 106 may send user intent data 120 to the routing controller 104. The routing controller 104 may define routing control setting(s), identify edge device(s), determine routing control setting(s) to apply, and send the routing data 122 to the edge device(s) using a new address family. For instance, the routing controller 104 may store site list(s) that identify edge device(s) associated with site(s) 110 within the SD-WAN. The routing control setting(s) may specify that edge device(s) within the site list have a routing control setting such as "Prefer Transport Gateway for particular site tag type(s)." Site tag type(s) 128 may correspond to a cloud, a branch, transport gateway, or any other suitable destination.

As illustrated, system 100B of FIG. 1B may also include transport gateway 126. Transport gateway 126 may comprise a router or other network device. In some examples, the transport gateway 126 may be configured to route network traffic of a particular type. For instance, the transport gateway 126 may be configured to route network traffic to a cloud service and may be configured with a site tag type of "transport gateway". As illustrated, the transport gateway 126 may send data and/or advertise the site tag type 128 to the routing controller 104. In some examples, the transport gateway 126 is configured to enable communication between cluster(s) of edge device(s) for cloud traffic.

As illustrated, system 100B of FIG. 1B may also include edge device(s) 136. Edge device(s) 136 may correspond to edge device(s) 108 described in FIG. 1A above. Edge device(s) 136 may represent a device within the system 100B that sends an advertisement 138 to the routing controller 104. For instance, the advertisement 138 may comprise a site tag type of "cloud". In this example, the routing controller 104 may determine the use of the site tag type "cloud" within the network based on the advertisement 138.

As illustrated in system 100B, the routing controller 104 may send routing data update(s) 130 to edge device(s) A 108A and edge device(s) B 108B. In the above example, the routing data update 130 may comprise instructions to change a routing control setting such that the edge device(s) A 108A and edge device(s) B 108B send network traffic destined for a cloud service via the transport gateway 126. As illustrated, edge device(s) A 108A may send second data traffic 134 (e.g., cloud traffic) to the transport gateway 126.

At "1", the system may monitor device(s) within the network(s). For instance, the system may monitor edge device(s) 108, site(s) 110, flow data, routing data, or any other type of data described herein. In some examples, the system may monitor connection(s) to the edge device(s). In some examples, the system may monitor the device(s) following the completion of steps 1-6 of FIG. 1A. In some examples, the system may monitor the device(s) independently of FIG. 1A.

At "2", the system may determine the advertisement of site tag type(s). For instance, the system may determine that a device (e.g., such as edge device(s) 136) is advertising (e.g., advertisement 138) the site tag type 128 of "cloud" within the network(s) 102. The system may further determine that a transport gateway 126 is advertising the site tag type 128 of "transport gateway." In some examples, the system may receive an indication that a transport gateway has been deployed within the network (e.g., such as from the management controller and/or from the transport gateway 126. The indication may comprise the site tag type associated with the transport gateway.

At "3", the system may generate a routing data update. For instance, the routing data update 130 may comprise an update to a routing control setting associated with one or more edge device(s) within a particular region, sub-region, site list, site, etc. of the SD-WAN. The routing data update 130 may update the routing control setting of the edge device(s), such that the edge device(s) A 108A, edge device(s) B 108B, and/or edge device(s) 136 send cloud traffic to the cloud via the transport gateway 126 and not via local network(s) 124.

At "4", the system may send the routing data update to the edge device(s) using the new address family. For instance, as described in FIG. 1A above, the system 100B may send the routing data update 130 using the new address family. In some examples, the routing data update 130 may be translated into an OMP update and sent to the edge device(s). Accordingly, the system may dynamically identify the introduction of new device(s) within the SD-WAN, dynamically identify edge device(s), and send update(s) to the edge device(s) in real time.

While the above example described the system 100B being performed based on a user defining the "Prefer Transport Gateway for particular site tag type(s)" OMP routing control setting, the system 100B of FIG. 1B is not limited to the examples described herein. In some examples, the system 100B of FIG. 1B may be performed where the user intent data does not define edge device(s) associated with the "Prefer Transport Gateway for particular site tag type(s)." Thus, the system 100B may automatically update routing control setting(s) without user input, where the updates are performed in a dynamic manner that can be driven by the appearance of transport gateway(s) within the SD-WAN.

In this way the system may provide an automatic and dynamic way to monitor the SD-WAN and apply routing control update(s) based on user intent and/or detection of site tag type(s). Accordingly, the system may provide a streamlined and simplified way to control routing in an SD-WAN overlay. That is, the system enables user intent to be defined by central routing controller, where the routing controller may use existing channels of communication with the edge routers to translate the user intent into the appropriate OMP routing control settings, which can then be distributed as OMP routing control updates to the appropriate edge routers. This enables updates to the edge device(s) to be distributed automatically and from a single source, thereby streamlining routing control processes and reducing network costs. Moreover, by utilizing a hierarchical and dynamic distribution model, the claimed techniques may enable the routing controller to automatically resolve conflicts between the applicable routing control settings and edge device settings, such that the routing control settings can be dynamically applied by the edge devices in real-time. Further, by enabling dynamic detection, the system may automatically apply routing control updates to edge device(s) based on user intent or based on a real-time monitoring of the SD-WAN.

Figure 2:
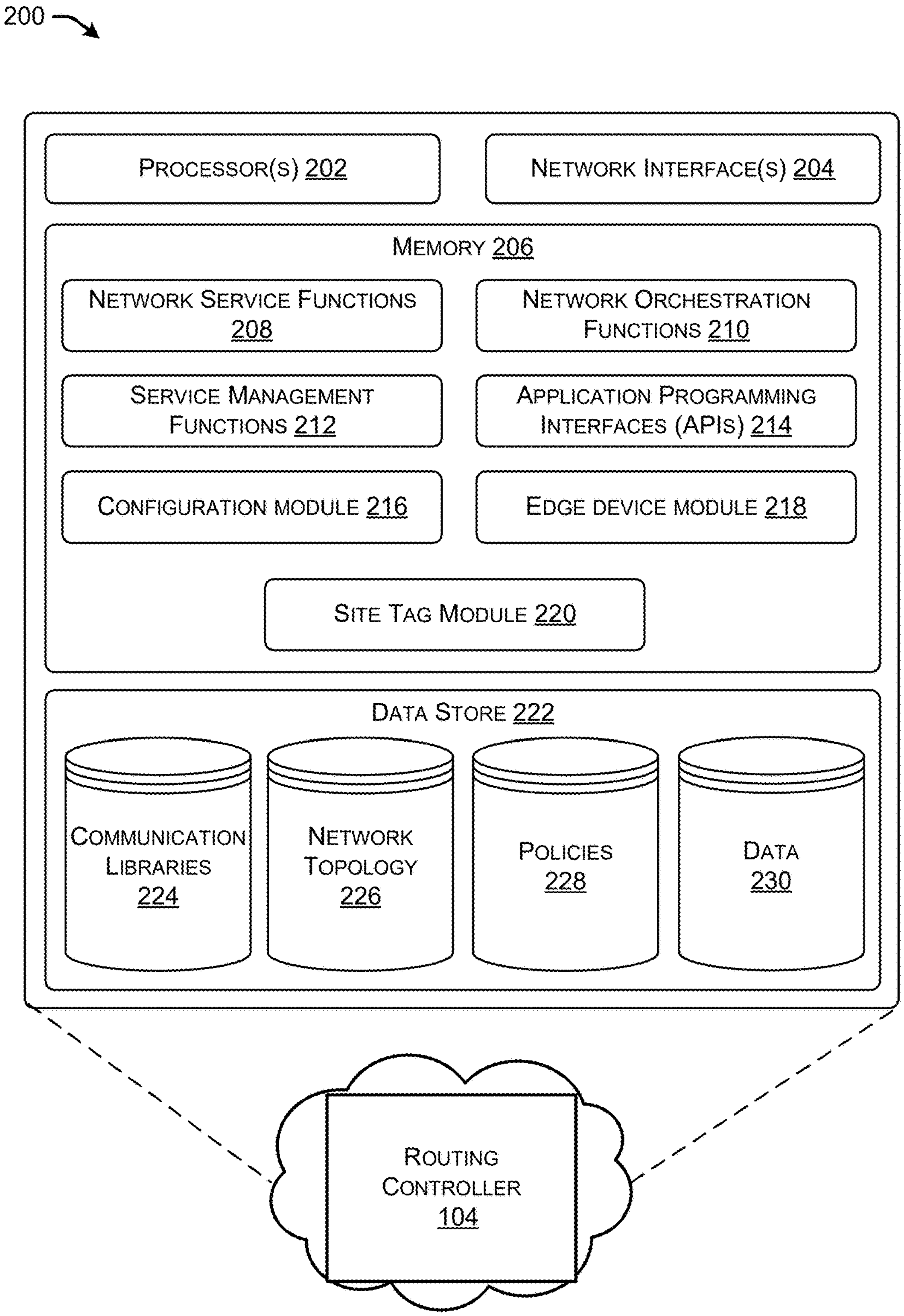
FIG. 2 illustrates a component diagram of an example controller, as described in FIGS. 1A and 1B.

FIG. 2 illustrates a component diagram of an example controller 200 described in FIGS. 1A and 1B. In some instances, one or more of the components of the routing controller 104 may run on one or more computing devices in, or associated with, the network(s) 102 (e.g., a single device or a system of devices), system 100, and/or system 100B. In some instances, the routing controller 104 may be integrated as part of a cloud-based management solution.

Generally, the routing controller 104 may include a programmable controller that manages some or all of the control plane activities of the network(s) 102 and manages or monitors the network state using one or more centralized control models.

As illustrated, the routing controller 104 may include, or run on, one or more hardware processors 202 (processors), one or more devices, configured to execute one or more stored instructions. The processor(s) 202 may comprise one or more cores. Further, the routing controller 104 may include or be associated with (e.g., communicatively coupled to) one or more network interfaces 204 configured to provide communications with edge device(s) and other devices, and/or other systems or devices in the network(s) 102 and/or remote from the network(s) 102. The network interfaces 204 may include devices configured to couple to personal area networks (PANs), wired and wireless local area networks (LANs), wired and wireless wide area networks (WANs), SDCI's, and so forth. For example, the network interfaces 204 may include devices compatible with any networking protocol.

The routing controller 104 may also include memory 206, such as computer-readable media, that stores various executable components (e.g., software-based components, firmware-based components, etc.). The memory 206 may generally store components to implement functionality described herein as being performed by the routing controller 104. The memory 206 may store one or more network service functions 208, such as a slicing manager, a topology manager to manage a topology of the network(s) 102, a host tracker to track what network components are hosting which programs or software, a switch manager to manage switches of the network(s) 102, a process manager, and/or any other type of function performed by the routing controller 104.

The routing controller 104 may further include network orchestration functions 210 stored in memory 206 that perform various network functions, such as resource management, creating and managing network overlays, programmable APIs, provisioning or deploying applications, software, or code to hosts, and/or perform any other orchestration functions. Further, the memory 206 may store one or more service management functions 212 configured to manage the specific services of the network(s) 102 (configurable), and one or more APIs 214 for communicating with devices in the network(s) 102 and causing various control plane functions to occur.

Further, the routing controller 104 may include configuration module 216. The configuration module 216 may be configured to receive user intent data 120 and configure routing control setting(s). For instance, an example configuration of routing control setting(s) associated may be defined as follows:

(config) omp overlay-routing-control (config-routing-control) region 1 # applied for all region-1 devices (config-routing-control-region) best-path transport-gateway prefer site-type cloud (config-routing-control-region) best-path region-path-length ignore (config-routing-control-region) affinity-preference 1.2

(config-routing-control) region 1 sub-region 2 # applied for all region 1.2 devices (config-routing-control-region)<routing-control-settings> . . .

(config-routing-control) site-list <name># for all devices in the specified site-list (config-routing-control-site-list)<routing-control-settings> . . .

(config-routing-control) site-tag <value># for all devices that match the site-tag In the above example, the configuration module 216 may define that all edge device(s) within region 1 have the routing control settings of "best-path transport-gateway prefer site-type cloud," "best-path region-path-length ignore," and "affinity-preference 1 2." The edge devices in region 1, sub-region 2 have routing control setting(s) that are different from those defined for region 1. Similarly, the configuration module 216 may define routing control settings based on a particular site list, a particular site tag type, a particular site, etc. Accordingly, a network administrator may configure the settings for various groups of edge device(s) within the network(s) 102 in a single configuration and removes the need to apply the changes manually and/or on a device-by-device basis.

The routing controller 104 may include edge device module 218. The edge device module 218 may be configured to monitor connection(s) to edge device(s) 108, determine routing control setting(s) to apply to a particular edge device, and send the routing control setting(s) (e.g., routing data 122 and/or routing data update 130) to the edge device(s). For instance, the edge device module 218 may utilize a hierarchy to determine which set of routing control setting(s) to apply to a particular edge device. As an example, an edge device may be located in region 1, sub-region 2. In the above example configuration, the edge device may be included in groups associated with the region 1 and region 1.2 sets of routing control setting(s). In this example, the edge device module 218 may apply the following precedence hierarchy, where site-list level routing control setting(s) may have the highest priority and will override everything else; site tag level routing control setting(s) have the second highest priority; sub-region level routing control setting(s) have the third highest priority; and region-level routing control setting(s) have the lowest priority and may be applied (if none of the above are available). Accordingly, in the above example, the edge device module 218 may determine to apply the sub-region 1.2 routing control settings to the particular device.

The routing controller 104 may include site tag module 220. The site tag module 220 may be configured to monitor traffic within the network(s) and determine when a new transport gateway is introduced and/or configured for the network(s) 102. For instance, the site tag module 220 may determine the use of a site tag type within the network(s) 102. For instance, the site tag module 220 may determine that the routing controller 104 has received advertisement(s) from edge device(s) that comprising a site tag type 128 (e.g., site tag type of "cloud", "transport gateway", etc.). In some examples, the site tag module 220 may receive an indication that a transport gateway has been deployed within the network (e.g., such as from the management controller and/or from the transport gateway 126. The indication may comprise an advertisement from the transport gateway that comprises the site tag type associated with the transport gateway (e.g., site tag type "transport gateway"). The site tag module 220 may determine that an advertisement has been received from another device within the network(s) 102. In some examples, the advertisement may comprise a site tag type of "cloud." In this example, the use of the site tag type of "cloud" (or any other suitable site tag type) within the network may cause the site tag module 220 to generate instructions. For instance, the site tag module 220 may be configured to send an instruction to the edge device module 218, to cause the edge device module 218 to generate and send routing data update(s) 130. Accordingly, the site tag module 220 may automatically and without input from a network administrator, detect the introduction and use of a new site tag type within the SD-WAN, and cause the edge device module 218 to dynamically identify edge device(s), and send update(s) to the edge device(s) in real time.

The routing controller 104 may further include a data store 222, such as long-term storage, that stores communication libraries 224 for the different communication protocols that the routing controller 104 is configured to use or perform. Additionally, the data store 222 may include network topology data 226, such as a model representing the layout of the network components in the network(s) 102 and/or data indicating available bandwidth, available CPU, delay between nodes, computing capacity, processor architecture, processor type(s), etc. The data store 222 may store policies 228 that include, but are not limited to, AAR policies, SLA policies, security data associated with the network, security policies configured for the network, firewall policies, firewall configuration data, security posture data, compliance policies configured for the network, best path configuration(s), routing control setting(s) and configuration(s). The data store 222 may store data and models 230 that includes flow data, pathway(s), telemetry data, network data, data traffic, identifier(s), user intent data, site tag type(s), associations between edge device(s) and various list(s) (e.g., site tag type(s), site list(s), sub-region list(s), region list(s), etc.) and/or any other data described herein.

Figure 3:
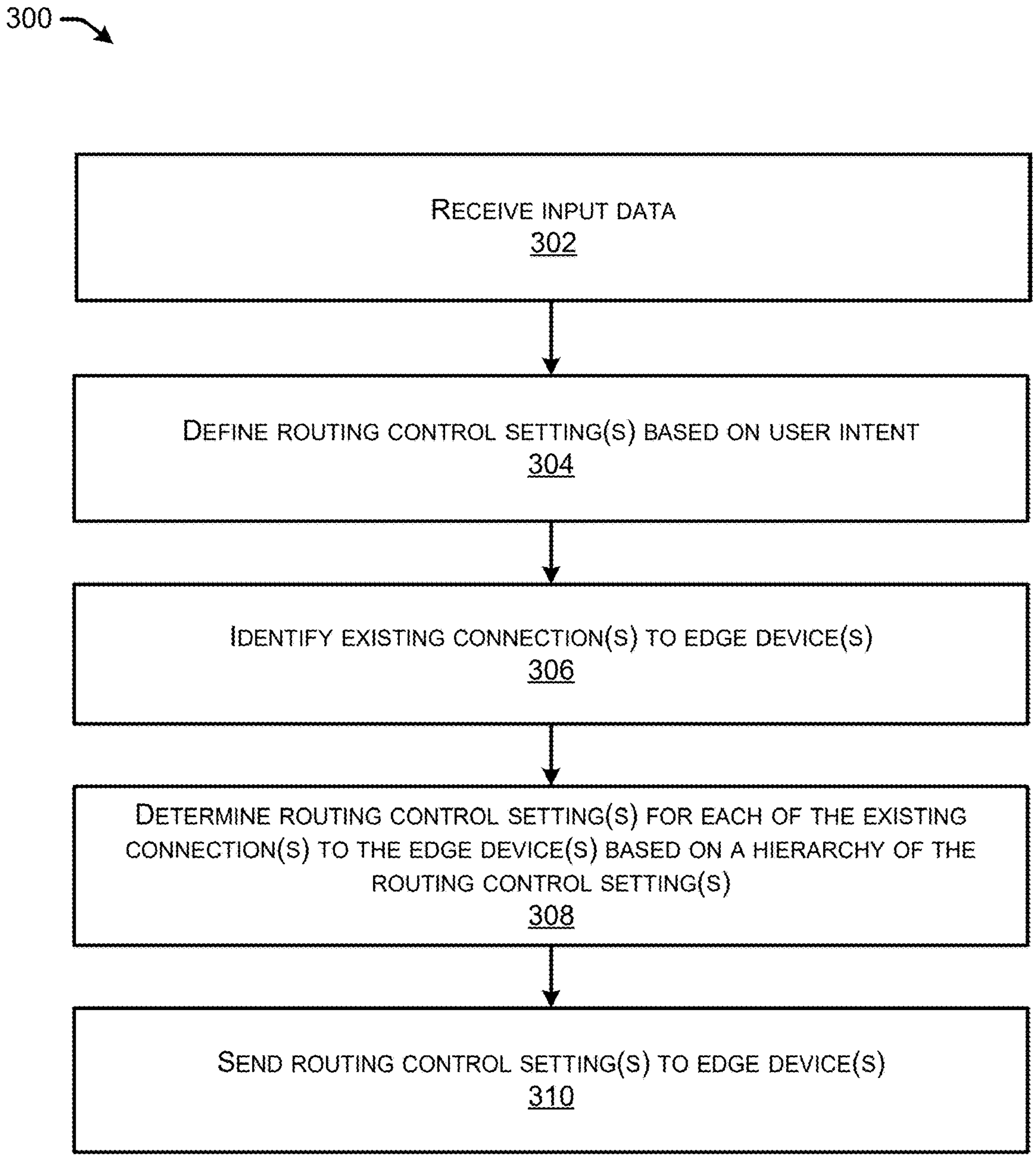
FIG. 3 illustrates a flow diagram of an example system for performing intent-based distribution of routing control setting(s) in a SD-WAN overlay associated with the system described in FIGS. 1-2.

FIG. 3 illustrates a flow diagram of an example system 300 for performing intent-based distribution of routing control setting(s) in a SD-WAN overlay, associated with the systems described in FIGS. 1A, 1B, and 2. In some instances, one or more of the steps of system 300 may be performed by one or more devices (e.g., routing controller 104, management controller 106, edge device(s) 108, etc.) that include one or more processors and one or more non-transitory computer-readable media storing computer-executable instructions that, when executed by the one or more processors, cause the one or more processors to perform operations of system 300.

At 302, the system may receive input data. For instance, the system may receive input data 118. As noted above, the input data may be associated with an action (e.g., a software update, a feature update, security patch, etc.) corresponding to edge device(s) 108 within a SD-WAN. In some examples, the routing controller 104 receives the input data. In some examples, the routing controller comprises a centrally configured routing controller that communicates with the one or more edge devices via an overlay management protocol.

At 304, the system may define routing control setting(s) based on user intent. For instance, the system may either receive user intent data 120 from a management controller 106 and/or determine user intent data 120 based on the input data. As described above, the system may define configurations for routing control setting(s). Routing control setting (s) may comprise a transport path gateway preference, a path length within a region to be ignored, or other routing control setting of the edge device. The routing control settings may correspond to OMP routing control setting that may impact and/or influence default SD-WAN routing behavior. In some examples, the routing control setting causes the edge device to change a local setting on the edge device. In some examples, the system may define the configuration(s) for the routing control settings using configuration module 216. In some examples, the system may store the configuration(s) and/or associated the configuration(s) with a profile of an administrator of the SD-WAN. As described above, the routing control settings may be configured to apply to particular edge devices based on a hierarchy including one or more site lists, one or more site tags, one or more sub-region identifiers, one or more region identifiers, or any other identifier described herein.

As described above, the system may define, by the controller, a new address family within a communication protocol (e.g., such as OMP). The new address family may be configured to send routing control settings to the edge device(s).

At 306, the system may identify existing connection(s) to edge device(s). For instance, the system may identify edge device(s) that have formed DTLS/TLS tunnel(s) 112 with the routing controller 104 using OMP protocol techniques. Identifying the existing connection(s) may include determining identifier(s) associated with the edge device(s) of each respective connection. The identifier(s) may comprise an edge device identifier, site identifier, site list, sub-region identifier, sub-region list, region identifier, region list, etc. associated with the edge device.

At 308, the system may determine routing control setting(s) for each of the existing connection(s) to the edge device(s) based on a hierarchy of the routing control setting (s). For instance, the system may access the configured routing control settings. The system may determine which of the configured routing control settings apply to a particular device, based on comparing the identifier(s) of the particular device to the configured routing control setting(s). In some examples, once a group of routing control settings is determined to apply to the particular edge device, the system may compare existing routing control settings on the particular edge device to the configured routing control setting(s) to determine which of the configured routing control settings need to be changed. For instance, the system may determine that all but one of the existing routing control settings on an edge device match the group of configured routing control settings that apply to the edge device. In this instance, the system may generate routing data 122 that includes the single routing control setting that needs to be changed on the edge device. Accordingly, the system may send all of the configured routing control settings within a grouping (e.g., the hierarchy) to the edge device or a subset of the configured routing control settings that include only the settings that need to be changed to match those defined based on the user intent.

At 310, the system may send routing control setting(s) to the edge device(s). In some examples, sending the routing control setting to the edge device causes the edge device to enable a feature associated with the routing control setting. In some examples, the system may translate the determined routing control setting(s) for a particular device into an OMP update, which may be sent to the edge device using the DTLS/TLS tunnel(s) 112 and/or accordingly to the new address family. The edge device may be configured to receive the OMP update, decode the OMP update, and dynamically apply instructions to change existing routing control setting(s) to the routing control setting(s) received from the routing controller 104. As noted above, the system may send the routing control setting(s) to a plurality of edge device(s) simultaneously, across the SD-WAN overlay (e.g., across region(s), sub-region(s), site(s), etc.). In some examples, the routing control setting(s) sent to each of the plurality of edge device(s) is configured for the particular edge device, based on the existing settings of each respective edge device.

In some examples, the system may determine, by the controller, use of a site tag type within the SD-WAN. The system may generate, by the controller and in response to determining the use, a routing control update based on the site tag type. The system may send, by the controller and to the one or more edge devices within the SD-WAN, the routing control update.

In this way, the system may provide a streamlined and simplified way to control routing in an SD-WAN overlay. That is, the system enables user intent to be defined by central routing controller, where the routing controller may use existing channels of communication with the edge routers to translate the user intent into the appropriate OMP routing control settings, which can then be distributed as OMP routing control updates to the appropriate edge routers. This allows a user to control routing and traffic engineering based on intent at the overlay level, instead of providing routing information on a device-to-device basis. Thus, updates to the edge device(s) can be distributed automatically and from a single source, thereby streamlining routing control processes and reducing network costs.

Figure 4:
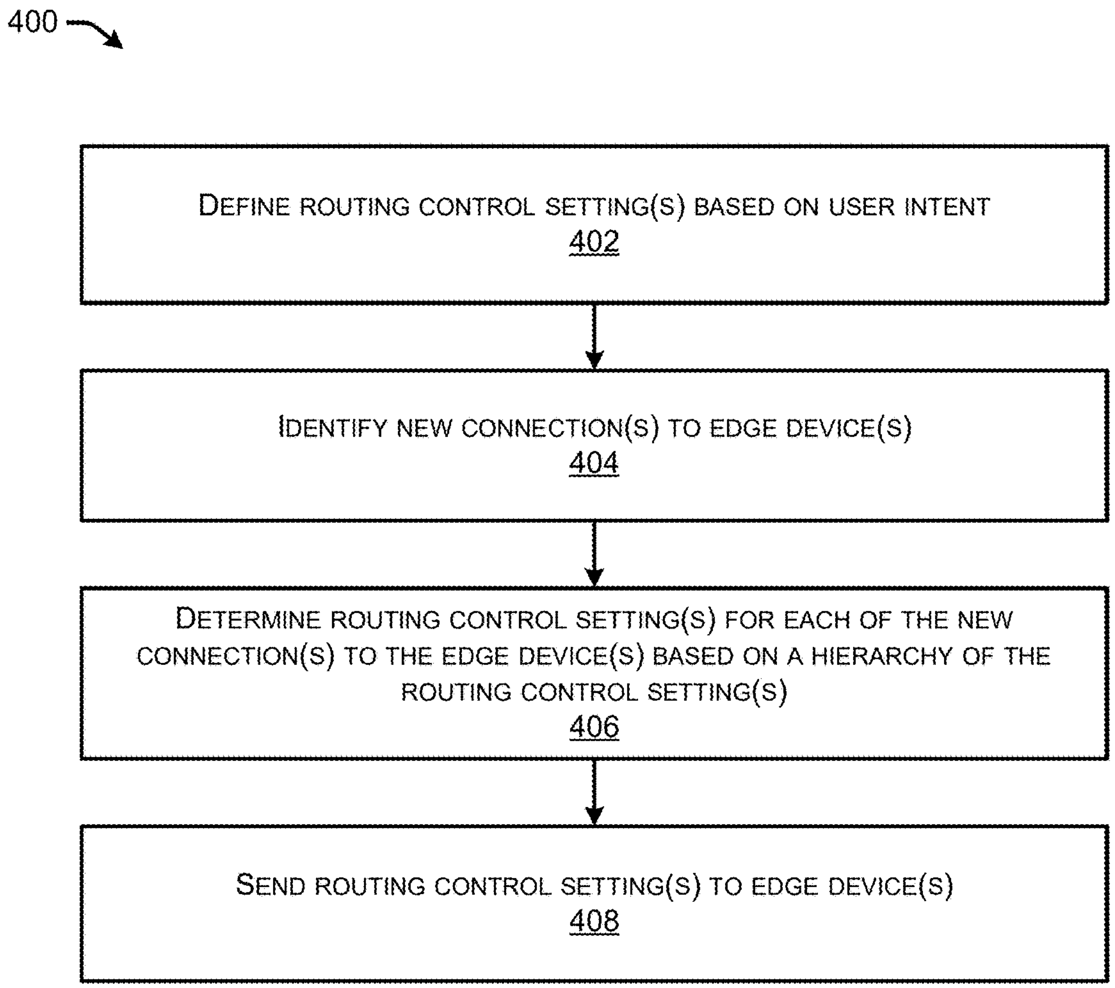
FIG. 4 illustrates a flow diagram of an example system for performing intent-based distribution of routing control setting(s) in a SD-WAN overlay associated with the system described in FIGS. 1-3.

FIG. 4 illustrates a flow diagram of an example system 400 for performing intent-based distribution of routing control setting(s) in a SD-WAN overlay, associated with the systems described in FIGS. 1-3. In some instances, one or more of the steps of system 400 may be performed by one or more devices (e.g., routing controller 104, management controller 106, edge device(s) 108, etc.) that include one or more processors and one or more non-transitory computer-readable media storing computer-executable instructions that, when executed by the one or more processors, cause the one or more processors to perform operations of system 400.

At 402, the system may define routing control setting(s) based on user intent. For instance, the system may either receive user intent data 120 from a management controller 106 and/or determine user intent data 120 based on the input data. As described above, the system may define configurations for routing control setting(s). Routing control setting(s) may comprise a transport path gateway preference, a path length within a region to be ignored, or other routing control setting of the edge device. The routing control settings may correspond to OMP routing control setting that may impact and/or influence default SD-WAN routing behavior. In some examples, the routing control setting causes the edge device to change a local setting on the edge device. In some examples, the system may define the configuration(s) for the routing control settings using configuration module 216. In some examples, the system may store the configuration(s) and/or associated the configuration(s) with a profile of an administrator of the SD-WAN. As described above, the routing control settings may be configured to apply to particular edge devices based on a hierarchy including one or more site lists, one or more site tags, one or more sub-region identifiers, one or more region identifiers, or any other identifier described herein.

As described above, the system may define, by the controller, a new address family within a communication protocol (e.g., such as OMP). The new address family may be configured to send routing control settings to the edge device(s).

At 404, the system may identify new connection(s) to edge device(s). For instance, the system may identify edge device(s) in response to a edge device being authenticated and forming a DTLS/TLS tunnel(s) 112 with the routing controller 104 using OMP protocol techniques.

At 406, the system may determine routing control setting(s) for each of the new connection(s) to the edge device(s) based on a hierarchy of the routing control setting (s). For instance, the system may access the configured routing control settings. The system may determine which of the configured routing control settings apply to a particular device, based on comparing the identifier(s) of the particular device to the configured routing control setting(s). In some examples, once a group of routing control settings is determined to apply to the particular edge device, the system may compare existing routing control settings on the particular edge device to the configured routing control setting(s) to determine which of the configured routing control settings need to be changed. For instance, the system may determine that all but one of the existing routing control settings on an edge device match the group of configured routing control settings that apply to the edge device. In this instance, the system may generate routing data 122 that includes the single routing control setting that needs to be changed on the edge device. Accordingly, the system may send all of the configured routing control settings within a grouping (e.g., the hierarchy) to the edge device or a subset of the configured routing control settings that include only the settings that need to be changed to match those defined based on the user intent.

At 408, the system may send the routing control setting(s) to the edge device(s). In some examples, sending the routing control setting to the edge device causes the edge device to enable a feature associated with the routing control setting. In some examples, the system may translate the determined routing control setting(s) for a particular device into an OMP update, which may be sent to the edge device using the DTLS/TLS tunnel(s) 112 and/or accordingly to the new address family. The edge device may be configured to receive the OMP update, decode the OMP update, and dynamically apply instructions to change existing routing control setting(s) to the routing control setting(s) received from the routing controller 104. As noted above, the system may send the routing control setting(s) to a plurality of edge device(s) simultaneously, across the SD-WAN overlay (e.g., across region(s), sub-region(s), site(s), etc.). In some examples, the routing control setting(s) sent to each of the plurality of edge device(s) is configured for the particular edge device, based on the existing settings of each respective edge device.

In this way, the system may the system may provide a streamlined and simplified way to control routing in an SD-WAN overlay. That is, the system enables user intent to be defined by central routing controller, where the routing controller may use existing channels of communication with the edge routers to translate the user intent into the appropriate OMP routing control settings, which can then be distributed as OMP routing control updates to the appropriate edge routers. This allows a user to control routing and traffic engineering based on intent at the overlay level, instead of providing routing information on a device-to-device basis. Thus, updates to the edge device(s) can be distributed automatically and from a single source, thereby streamlining routing control processes and reducing network costs.

Figure 5:
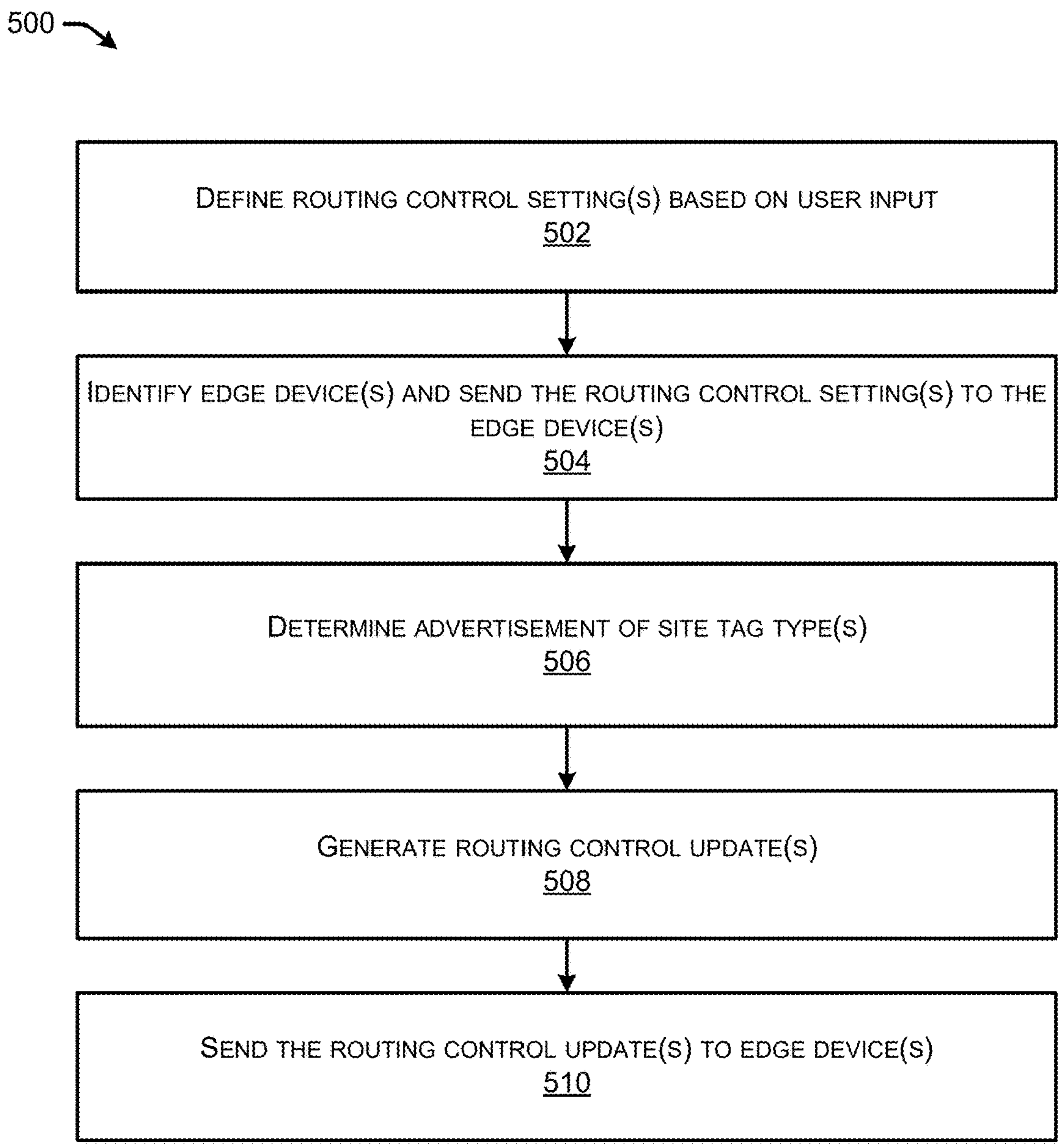
FIG. 5 illustrates a flow diagram of an example system for performing automatic and dynamic distribution of routing control setting(s) in a SD-WAN overlay associated with the system described in FIGS. 1-4.

FIG. 5 illustrates a flow diagram of an example system 500 for performing automatic and dynamic distribution of routing control setting(s) in a SD-WAN overlay, associated with the systems described in FIGS. 1-4. In some instances, one or more of the steps of system 500 may be performed by one or more devices (e.g., routing controller 104, management controller 106, edge device(s) 108, etc.) that include one or more processors and one or more non-transitory computer-readable media storing computer-executable instructions that, when executed by the one or more processors, cause the one or more processors to perform operations of system 500.

At 502, the system may define routing control setting(s) based on user input. For instance, the system may either receive user intent data 120 from a management controller 106 and/or determine user intent data 120 based on the input data. As described above, the system may define configurations for routing control setting(s). Routing control setting(s) may comprise a transport path gateway preference, a path length within a region to be ignored, or other routing control setting of the edge device. The routing control settings may correspond to OMP routing control setting that may impact and/or influence default SD-WAN routing behavior. In some examples, the routing control setting causes the edge device to change a local setting on the edge device. In some examples, the system may define the configuration(s) for the routing control settings using configuration module 216. In some examples, the system may store the configuration(s) and/or associated the configuration(s) with a profile of an administrator of the SD-WAN. As described above, the routing control settings may be configured to apply to particular edge devices based on a hierarchy including one or more site lists, one or more site tags, one or more sub-region identifiers, one or more region identifiers, or any other identifier described herein.

As described above, the system may define, by the controller, a new address family within a communication protocol (e.g., such as OMP). The new address family may be configured to send routing control settings to the edge device(s).

At 504, the system may identify edge device(s) and send the routing control setting(s) to the edge device(s). For instance, the system may identify edge device(s) that have previously formed DTLS/TLS tunnel(s) 112 with the routing controller 104 using OMP protocol techniques and/or identify the edge device(s) when a new connection is formed between the edge device and the routing controller 104. Identifying the existing connection(s) may include determining identifier(s) associated with the edge device(s) of each respective connection. The identifier(s) may comprise an edge device identifier, site identifier, site list, sub-region identifier, sub-region list, region identifier, region list, etc. associated with the edge device.

The system may determine routing control setting(s) for each of the existing connection(s) to the edge device(s) based on a hierarchy of the routing control setting(s). For instance, the system may access the configured routing control settings. The system may determine which of the configured routing control settings apply to a particular device, based on comparing the identifier(s) of the particular device to the configured routing control setting(s). In some examples, once a group of routing control settings is determined to apply to the particular edge device, the system may compare existing routing control settings on the particular edge device to the configured routing control setting(s) to determine which of the configured routing control settings need to be changed. For instance, the system may determine that all but one of the existing routing control settings on an edge device match the group of configured routing control settings that apply to the edge device. In this instance, the system may generate routing data 122 that includes the single routing control setting that needs to be changed on the edge device. Accordingly, the system may send all of the configured routing control settings within a grouping (e.g., the hierarchy) to the edge device or a subset of the configured routing control settings that include only the settings that need to be changed to match those defined based on the user intent.

In some examples, sending the routing control setting to the edge device causes the edge device to enable a feature associated with the routing control setting. In some examples, the system may translate the determined routing control setting(s) for a particular device into an OMP update, which may be sent to the edge device using the DTLS/TLS tunnel(s) 112 and/or accordingly to the new address family. The edge device may be configured to receive the OMP update, decode the OMP update, and dynamically apply instructions to change existing routing control setting(s) to the routing control setting(s) received from the routing controller 104. As noted above, the system may send the routing control setting(s) to a plurality of edge device(s) simultaneously, across the SD-WAN overlay (e.g., across region(s), sub-region(s), site(s), etc.). In some examples, the routing control setting(s) sent to each of the plurality of edge device(s) is configured for the particular edge device, based on the existing settings of each respective edge device.

At 506, the system may detect use of site tag type(s). For instance, the system may monitor the SD-WAN, such as using site tag module 220. The system may monitor edge device(s) 108, site(s) 110, flow data, routing data, or any other type of data described herein. In some examples, the system may monitor connection(s) to the edge device(s). For instance, the system may determine the advertisement of site tag type(s). For instance, the system may determine that a device (e.g., such as edge device(s) 136) is advertising (e.g., advertisement 138) the site tag type 128 of "cloud" within the network(s) 102. The system may further determine that a transport gateway 126 is advertising the site tag type 128 of "transport gateway." In some examples, the system may receive an indication that a transport gateway has been deployed within the network (e.g., such as from the management controller and/or from the transport gateway 126. The indication may comprise the site tag type associated with the transport gateway. The system may be configured to send an instruction to the edge device module 218, to cause the edge device module 218 to generate and send routing data update(s) 130. Accordingly, the site tag module 220 may automatically and without input from a network administrator, detect the introduction of a new site tag type within the SD-WAN, and cause the edge device module 218 to dynamically identify edge device(s), and send update(s) to the edge device(s) in real time.

At 508, the system may generate routing control update(s). For instance, the system may dynamically determine, based on the site tag type, one or more edge device(s) within the SD-WAN to send routing control update(s) to. For instance, the system may determine that the one or more edge device(s) have existing settings that do not utilize or prefer the particular site tag type.

In some examples, the system may determine that the site tag type is associated with a configured routing control setting that specifies the one or more edge device(s). In some examples, the system may generate the routing control update(s) automatically and in response to the site tag type being introduced to the SD-WAN. For instance, the system may generate the routing control update even where the configured routing control settings do not define setting(s) associated with the site tag type.

At 510, the system may send the routing control update(s) to the edge device(s). In some examples, sending the routing control update(s) to the edge device causes the edge device to enable a feature associated with the routing control setting. In some examples, the system may translate the routing control update(s) for a particular device into an OMP update, which may be sent to the edge device using the DTLS/TLS tunnel(s) 112 and/or accordingly to the new address family. The edge device(s) may be configured to receive the OMP update, decode the OMP update, and dynamically apply instructions to change existing routing control setting(s) to the routing control setting(s) received in the routing control update from the routing controller 104. As noted above, the system may send the routing control update(s) to a plurality of edge device(s) simultaneously, across the SD-WAN overlay (e.g., across region(s), sub-region(s), site(s), etc.). In some examples, the routing control update(s) sent to each of the plurality of edge device(s) is configured for the particular edge device, based on the existing settings of each respective edge device.

In this way, the system may automatically and dynamically distribute routing control setting(s) to edge device(s) based on either user intent (e.g., the configured routing control settings) and/or real-time monitoring of the network. Accordingly, the system may provide a streamlined and simplified way to control routing in an SD-WAN overlay. That is, the system enables user intent to be defined by central routing controller, where the routing controller may use existing channels of communication with the edge routers to translate the user intent into the appropriate OMP routing control settings, which can then be distributed as OMP routing control updates to the appropriate edge routers. This enables updates to the edge device(s) to be distributed automatically and from a single source, thereby streamlining routing control processes and reducing network costs. Moreover, by utilizing a hierarchical and dynamic distribution model, the claimed techniques may enable the routing controller to automatically resolve conflicts between the applicable routing control settings and edge device settings, such that the routing control settings can be dynamically applied by the edge devices in real-time. Further, by enabling dynamic detection, the system may automatically apply routing control updates to edge device(s) based on user intent or based on a real-time monitoring of the SD-WAN.

Figure 6:
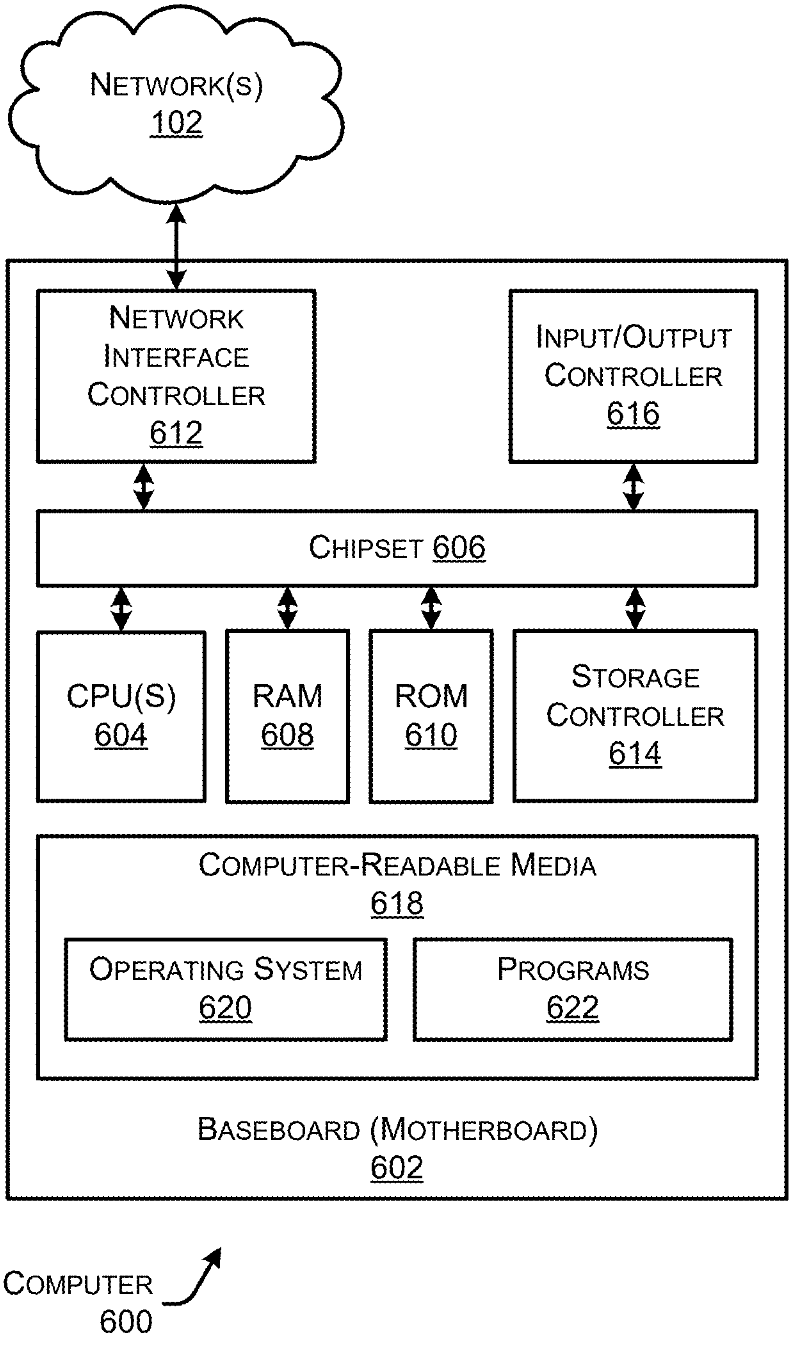
FIG. 6 is a computer architecture diagram showing an illustrative computer hardware architecture for implementing a device that can be utilized to implement aspects of the various technologies presented herein.

FIG. 6 shows an example computer architecture for a device capable of executing program components for implementing the functionality described above. The computer architecture shown in FIG. 6 illustrates any type of computer 600, such as a conventional server computer, workstation, desktop computer, laptop, tablet, network appliance, e-reader, smartphone, or other computing device, and can be utilized to execute any of the software components presented herein. The computer may, in some examples, correspond to a routing controller 104, management controller 106, edge device(s) 108, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 600 includes a baseboard 602, or "motherboard," which is a printed circuit board to which a multitude of components or devices can be connected by way of a system bus or other electrical communication paths. In one illustrative configuration, one or more central processing units ("CPUs 604") operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as network(s) 102. The chipset 606 can include functionality for providing network connectivity through a NIC 612, such as a gigabit Ethernet adapter. The NIC 612 is capable of connecting the computer 600 to other computing devices over the network(s) 102. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the routing controller 104, management controller 106, edge device(s) 108, and/or any components included therein, may be supported by one or more devices similar to computer 600. Stated otherwise, some or all of the operations performed by the routing controller 104, management controller 106, edge device(s) 108, and/or any components included therein, may be performed by one or more computer devices.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

As described herein, the computer 600 may comprise one or more of a routing controller 104, management controller 106, edge device(s) 108, and/or any other device. The computer 600 may include one or more hardware processors (processor(s), such as CPUs 604) configured to execute one or more stored instructions. The processor(s) may comprise one or more cores. Further, the computer 600 may include one or more network interfaces configured to provide communications between the computer 600 and other devices, such as the communications described herein as being performed by the routing controller 104, management controller 106, edge device(s) 108, and/or any other device. The network interfaces may include devices configured to couple to personal area networks (PANs), wired and wireless local area networks (LANs), wired and wireless wide area networks (WANs), SDWANs, and so forth. For example, the network interfaces may include devices compatible with Ethernet, Wi-Fi™, and so forth.

The programs 622 may comprise any type of programs or processes to perform the techniques described in this disclosure. For instance, the programs 622 may cause the computer 600 to perform techniques including receiving, by the controller, input data associated with an action corresponding to one or more edge devices within the SD-WAN; defining, by the controller and based on the input data, routing control settings associated with the action; identifying, by the controller, a connection to an edge device of the one or more edge devices; determining, by the controller and based on identifying the edge device, a routing control setting of the routing control settings to apply to the edge device; and sending, by the controller, the routing control setting to the edge device.

In this way, the computer 600 may automatically and dynamically distribute routing control setting(s) to edge device(s) based on either user intent (e.g., the configured routing control settings) and/or real-time monitoring of the network. Accordingly, the system may provide a streamlined and simplified way to control routing in an SD-WAN overlay. That is, the system enables user intent to be defined by central routing controller, where the routing controller may use existing channels of communication with the edge routers to translate the user intent into the appropriate OMP routing control settings, which can then be distributed as OMP routing control updates to the appropriate edge routers. This enables updates to the edge device(s) to be distributed automatically and from a single source, thereby streamlining routing control processes and reducing network costs. Moreover, by utilizing a hierarchical and dynamic distribution model, the claimed techniques may enable the routing controller to automatically resolve conflicts between the applicable routing control settings and edge device settings, such that the routing control settings can be dynamically applied by the edge devices in real-time. Further, by enabling dynamic detection, the system may automatically apply routing control updates to edge device(s) based on user intent or based on a real-time monitoring of the SD-WAN.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for routing control performed by a controller of a software-defined wide area network (SD-WAN), the method comprising:

receiving, by the controller and from a network administrator, user intent data indicative of behavioral-level routing preferences for configuring local settings of a plurality of edge devices within the SD-WAN to exhibit a particular routing behavior, the user intent data being free of per-device routing configuration data;

translating, by the controller, the user intent data into routing control settings for configuring the plurality of edge devices to exhibit the particular routing behavior;

identifying, by the controller, a connection to an edge device of the plurality of edge devices;

determining, by the controller and based on identifying the connection to the edge device, a routing control setting of the routing control settings to apply to the edge device, wherein the routing control setting configures the edge device to make local routing decisions in accordance with the particular routing behavior; and sending, by the controller, the routing control setting to the edge device.

2. The method of claim 1, wherein the controller comprises a centrally configured routing controller that communicates with the plurality of edge devices via an overlay management protocol.

3. The method of claim 1, wherein the routing control setting comprises one or more of a transport path gateway preference or a path length within a region to be ignored.

4. The method of claim 1, wherein the user intent data specifies the particular routing behavior for a group of the plurality of edge devices that are associated with a specified physical location, virtual location, or region.

5. The method of claim 1, wherein the routing control settings are configured to apply to particular edge devices based on a hierarchy including one or more site lists, one or more site tags, one or more sub-region identifiers, or one or more region identifiers.

6. The method of claim 1, wherein sending the routing control setting to the edge device causes the edge device to enable a feature associated with the routing control setting.

7. The method of claim 1, further comprising:
- defining, by the controller, a new address family within a communication protocol,
- wherein sending the routing control setting to the edge device is via the new address family.

8. The method of claim 1, further comprising:
- determining, by the controller, use of a site tag type within the SD-WAN;
- generating, by the controller and in response to determining the use, a routing control update based on the site tag type; and
- sending, by the controller and to one or more of the plurality of edge devices within the SD-WAN, the routing control update.

9. The method of claim 1, wherein the connection comprises an existing connection to the edge device or a new connection to the edge device.

10. A system comprising:
- one or more processors; and
- one or more computer-readable media storing instructions that, when executed by the one or more processors, cause the one or more processors to perform operations comprising:
  - receiving, from a network administrator, user intent data indicative of behavioral-level routing preferences for configuring local settings of a plurality of edge devices within a software-defined wide area network (SD-WAN) to exhibit a particular routing behavior, the user intent data being free of per-device routing configuration data;
  - translating the user intent data into routing control settings for configuring the plurality of edge devices to exhibit the particular routing behavior;
  - identifying a connection to an edge device of the plurality of edge devices;
  - determining, based on identifying the connection to the edge device, a routing control setting of the routing control settings to apply to the edge device, wherein the routing control setting configures the edge device to make local routing decisions in accordance with the particular routing behavior; and
  - sending the routing control setting to the edge device.

11. The system of claim 10, wherein the system is a centrally configured routing controller that communicates with the plurality of edge devices via an overlay management protocol.

12. The system of claim 10, wherein the routing control setting comprises one or more of a transport path gateway preference or a path length within a region to be ignored.

13. The system of claim 10, wherein the routing control setting causes the edge device to change a local setting on the edge device.

14. The system of claim 10, wherein the routing control settings are configured to apply to particular edge devices based on a hierarchy including one or more site lists, one or more site tags, one or more sub-region identifiers, or one or more region identifiers.

15. The system of claim 10, wherein sending the routing control setting to the edge device causes the edge device to enable a feature associated with the routing control setting.

16. The system of claim 10, the operations further comprising:
- defining a new address family within a communication protocol,
- wherein sending the routing control setting to the edge device is via the new address family.

17. The system of claim 10, the operations further comprising:
- determining use of a site tag type within the SD-WAN;
- generating, in response to determining the use, a routing control update based on the site tag type; and
- sending, to one or more of the plurality of edge devices within the SD-WAN, the routing control update.

18. The system of claim 10, wherein the connection comprises an existing connection to the edge device or a new connection to the edge device.

19. One or more non-transitory computer-readable media maintaining instructions that, when executed by one or more processors, program the one or more processors to perform operations comprising:
- receiving user intent data indicative of behavioral-level routing preferences for configuring local settings of one or more edge devices within a network to exhibit a particular routing behavior, the user intent data being free of per-device routing configuration data;
- generating, based on the user intent data, routing control settings for configuring the plurality of edge devices to exhibit the particular routing behavior;
- identifying a connection to an edge device of the plurality of edge devices;
- determining, based on identifying the connection to the edge device, a routing control setting of the routing control settings to apply to the edge device, wherein the routing control setting configures the edge device to make local routing decisions in accordance with the particular routing behavior; and
- sending the routing control setting to the edge device.

20. The one or more non-transitory computer-readable media of claim 19, the operations further comprising:
- defining a new address family within a communication protocol,
- wherein sending the routing control setting to the edge device is via the new address family.

* * * * *